United States Patent [19]

Ando et al.

[11] Patent Number: 4,739,348

[45] Date of Patent: Apr. 19, 1988

[54] RECORDING HEAD ASSEMBLY USING MAGNETIC TONER AND IMAGE FORMING APPARATUS USING THE SAME

[75] Inventors: Yujiro Ando; Haruo Fujii, both of Yokohama; Takashi Saito, Ichikawa, all of Japan

[73] Assignee: Canon Kabushiki Kaisha, Tokyo, Japan

[21] Appl. No.: 91,365

[22] Filed: Aug. 28, 1987

Related U.S. Application Data

[63] Continuation of Ser. No. 908,726, Sep. 18, 1986, abandoned.

[30] Foreign Application Priority Data

Oct. 1, 1985 [JP] Japan ............ 60-218578
Jun. 5, 1986 [JP] Japan ............ 61-130699

[51] Int. Cl.[4] ............ G01D 15/10

[52] U.S. Cl. ............ 346/155; 346/160.1; 346/139 C

[58] Field of Search ............ 346/155, 139 C, 74.5, 346/160.1; 400/114; 101/DIG. 13; 350/300, 301; 355/3 DD

[56] References Cited

U.S. PATENT DOCUMENTS

| | | | |
|---|---|---|---|
| 3,816,840 | 6/1974 | Kotz | 346/74 ES |
| 3,879,737 | 4/1975 | Lunde | 346/74 ES |
| 3,914,771 | 10/1975 | Lunde et al. | 346/74 ES |
| 3,946,402 | 3/1976 | Lunde | 346/74 ES |
| 4,268,598 | 5/1981 | Leseman et al. | 430/107 |
| 4,464,672 | 8/1984 | Lindahl | 346/153.1 |
| 4,559,545 | 12/1985 | Iemura et al. | 346/155 |

*Primary Examiner*—Arthur G. Evans
*Attorney, Agent, or Firm*—Fitzpatrick, Cella, Harper & Scinto

[57] ABSTRACT

A recording technique for causing a magnetic toner to pass through needle-like recording electrodes by a magnetic force and forming a toner image on a recording medium by a signal voltage applied to each recording electrode uses an arrangement to allow smooth flow of the toner near the recording electrodes; namely openings are formed in a wiring member along the recording electrodes, and the toner passes through the openings.

30 Claims, 5 Drawing Sheets

RECORDING HEAD ASSEMBLY USING MAGNETIC TONER AND IMAGE FORMING APPARATUS USING THE SAME

This application is a continuation of application Ser. No. 908,726, filed Sept. 18, 1986, now abandoned.

BACKGROUND OF THE INVENTION

1. Field of the Invention

The present invention relates to an image forming apparatus and, more particularly, to a recording electrode assembly used in an image forming apparatus such as a printer or a display device of a type wherein a voltage is applied between a recording electrode and a recording medium to attach image forming particles (i.e., toner) to be recording medium, and an image forming apparatus using the electrode assembly.

2. Related Background Art

Examples of such a conventional image forming method are described in U.S. Pat. Nos. 3,816,840, 3,914,771, 3,946,402, and 4,268,598. According to this image forming method, as shown in FIG. 2, conductive magnetic toner 1 is fed onto a nonmagnetic cylinder 3 in a predetermined direction by a rotary magnet 2 having opposite magnetic poles arranged alternately along its circumferential direction. The toner 1 passes through a large number of recording electrodes 4 adjacent ones of which are electrically insulated from each other. A voltage is applied between the recording electrodes 4 and a conductive layer 7 on the recording medium 5 with an insulating layer formed thereon. The toner applied with a voltage having a polarity opposite that of the voltage applied to the conductive layer 7 is attracted to the insulating layer 6 on the surface of the recording medium, thereby forming an image.

The arrangement of a recording apparatus according to the above method is very simple and provides many advantages. However, the recording apparatus presents a major disadvantage in that the recording electrodes cannot be subjected to division driving. More specifically, signal voltages must be independently applied to the recording electrodes to form an image. For this purpose, conductive wires having the same number as that of the recording electrodes must be arranged between the recording electrodes and an electrode driver so as not to interfere with toner feeding.

In a conventional apparatus of this type, the wires run along the nonmagnetic cylinder 3 and are guided along the axial direction thereof. A typical example is illustrated in FIG. 3. The recording electrodes 4 are connected to conductive wires 8 formed on a flexible printed circuit board in units of recording electrodes 4. The conductive wires 8 are axially bent and guided on the nonmagnetic cylinder 3. Another typical example of wiring is described in U.S. Pat. No. 3,879,737.

According to the method wherein the electrodes are divided into blocks and are connected in units of blocks, however, high precision of connections between the electrode blocks cannot be obtained. In addition, connections of the wire electrodes stacked and axially guided are complicated. According to still another conventional example, the recording electrodes and the electrode driver are formed integrally on the nonmagnetic cylinder 3. However, it is difficult to mount all components so as not to interfere with toner feeding on the nonmagnetic cylinder.

SUMMARY OF THE INVENTION

It is an object of the present invention to provide a recording electrode assembly which solves the above conventional problems.

It is another object of the present invention to provide an image forming apparatus using recording electrodes which allows smooth flow of the toner.

In order to achieve the above objects of the present invention, a recording electrode assembly of the present invention comprises recording electrodes extending along a direction perpendicular to a moving direction of a magnetic field from a moving magnetic field generating means, and a wiring member having openings through which toner moved by a magnetic force of the magnetic field generating means and conductive portions corresponding to the recording electrodes so as to allow conduction with an electrode driver. The image forming apparatus according to the present invention uses the above recording electrode assembly and causes the recording electrodes to operate to form a toner image on a transfer medium.

The above and other objects, features, and advantages of the present invention will be apparent from the following detailed description with reference to the preferred embodiments.

DETAILED DESCRIPTION OF THE PREFERRED EMBODIMENTS

Figure 1A:
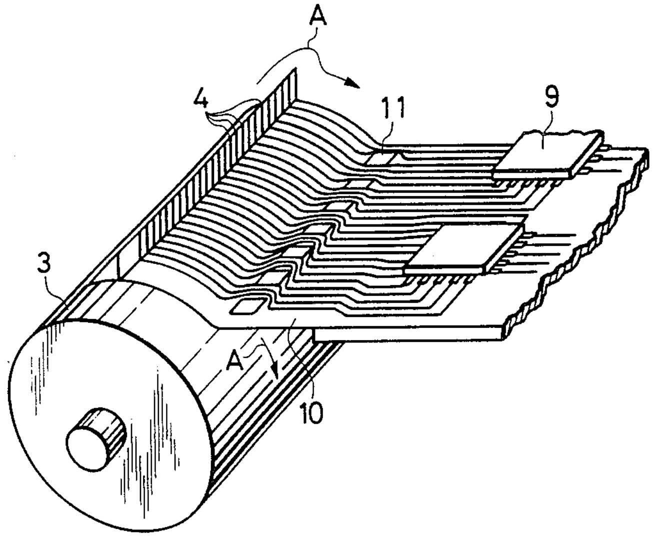
FIG. 1A is a perspective view showing an embodiment of an image recording unit according to the present invention.

FIG. 1A shows an embodiment of the present invention. Recording electrodes 4 are connected to electrode drivers 9 through a flexible printed circuit board 10. A portion of the flexible printed circuit board 10 near the recording electrodes 4 is in contact with or adhered to a nonmagnetic cylindrical member 3. The flexible printed circuit board 10 is then bent and separated from the nonmagnetic cylindrical member 3, and openings 11 are formed at the bent portion. The wires contour the openings 11, as shown in FIG. 1A. A toner for forming an image circulates on the nonmagnetic cylindrical member 3 through the openings 11 upon rotation of a rotary magnet mounted in the cylindrical member 3.

The size of the openings 11 can be arbitrarily determined though it depends on the size of the toner particle. It is found that an opening having a size falling within the range of 0.2 mm to 10 mm functions properly. An opening pitch can fall within the range of ½ to twice the diameter of the opening. These openings are formed by a mechanical means such as drilling and punching. The openings are preferably formed from the toner insertion surface so as to obtain a smooth surface on the flexible printed circuit board. Although the recording electrodes can be connected to the flexible printed circuit board by soldering or a conductive adhesive, the recording electrodes are most preferably formed on the flexible printed circuit board by plating or the like so as to improve precision of the electrodes. The connection portions of electrical components such as electrode drivers are linearly formed on the flexible printed circuit board to substantially eliminate wiring operation.

Figure 1B:
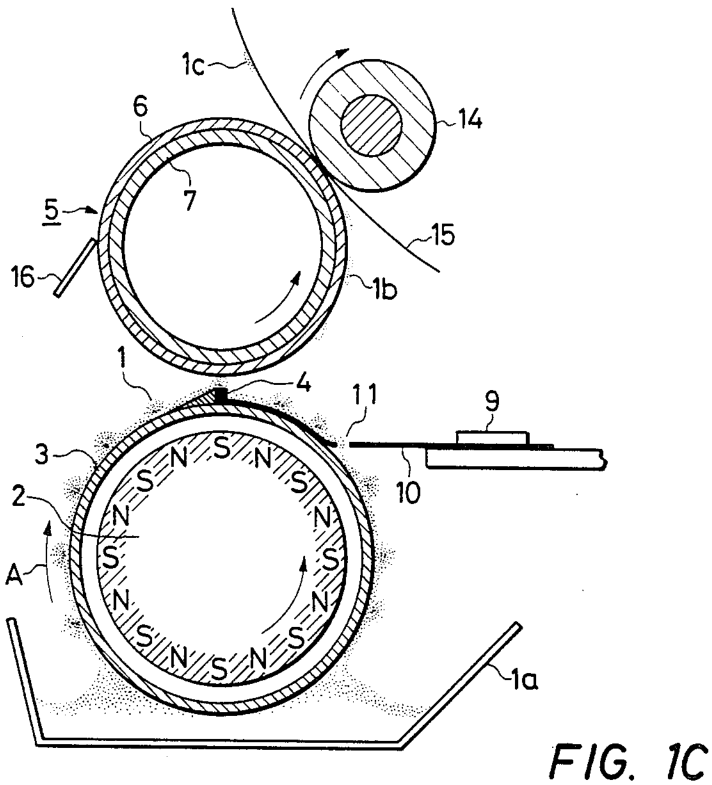
FIG. 1B is a side sectional view showing the concept of an apparatus with the image recording unit in FIG. 1A.
Figure 1C:
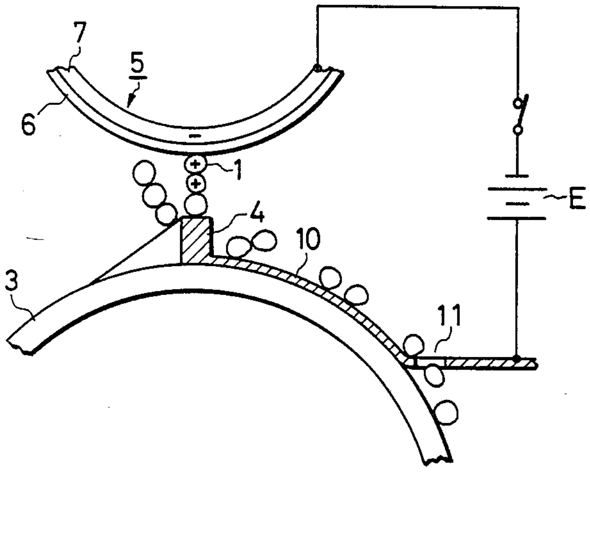
FIG. 1C is a sectional view illustrating the principle of recording and the phenomenon of the present invention.
Figure 2:
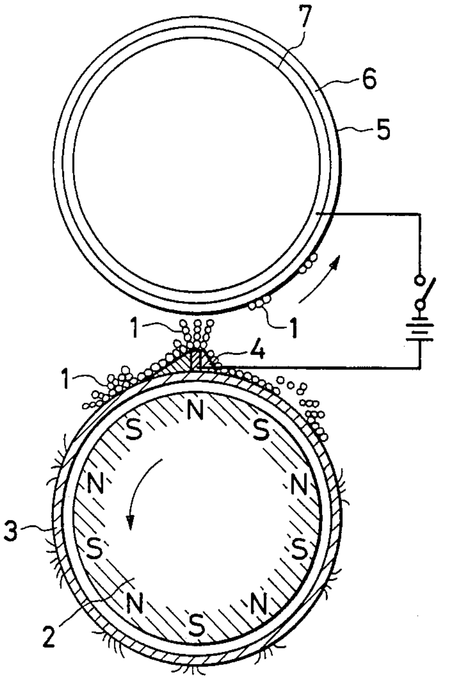
FIG. 2 is a sectional view illustrating an image recording method to which the present invention is applied.

FIG. 1B shows a side section of the recording unit in FIGS. 1A, and 1C shows image formation by the electrodes according to the present invention. Toner 1 is stored in a hopper 1*a*. The toner 1 in the hopper 1*a* is attracted to the surface of the cylinder 3 by a rotary magnet 2 and reaches the recording electrodes 4. At positions of the recording electrodes 4, an electric field is formed between the toner 1 applied with a recording signal voltage E and conductive layer 7 formed on a recording medium 5 on which an insulating layer 6 is formed. If the magnetic field has a higher intensity than the attracting force of the toner 1 onto the recording medium 5 and overcomes the toner attracting force of the electrodes, the toner 1 is moved onto the recording medium 5. However, a magnetic field is not formed for the electrodes without being applied with the signal voltage, and the toner is moved onto the printed circuit board 10 by the magnetic force. The toner particles pass through the openings 11 and reach onto the cylindrical member.

A toner image 1*b* formed on the recording medium 5 is brought into contact with a transfer medium 15 at a transfer position. The rear surface of the transfer medium 15 is urged by a ground or biased roller 14 to transfer the toner image 1*b* to the transfer medium 15. A toner image 1*c* on the transfer medium 15 is fixed thereon.

The residual toner particles left on the recording medium 5 after toner image transfer may be positively removed by a cleaning unit 16 as needed. However, these toner particles may be removed by the magnetic force from the cylindrical member 3 at the recording electrode position.

Figure 5:
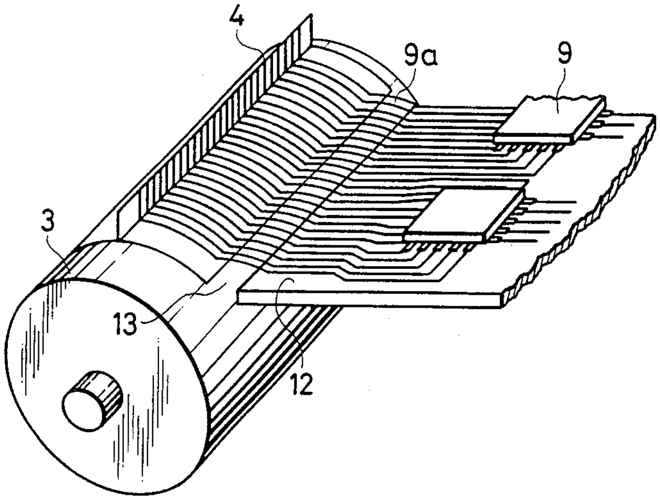
FIG. 5 is a perspective view showing still another embodiment of openings according to the present invention.

The recording electrodes are simply connected to the drivers through the flexible printed circuit board in FIG. 1A. However, the output terminal of the electrode driver may be connected to a corresponding one of electrodes by a means such as soldering, which arrangement is illustrated in FIG. 5. In this case, the toner is circulated through openings 13 defined by gaps between adjacent insulated wires 9*a*. In this case, although wiring is required, electrode drivers may be formed on a hard printed circuit board 12 and can be located near the nonmagnetic cylinder along its longitudinal direction in the same manner as in FIG. 1A, extra space can be eliminated, and the recording unit as a whole can be made compact.

Figure 4:
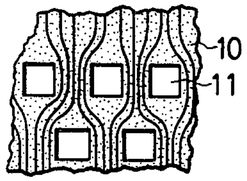
FIG. 4 is a plan view showing another embodiment of openings accoroding to the present invention.

FIG. 4 shows another embodiment of openings. The openings 11 in FIG. 1A are aligned in line. However, the openings 11 may be arranged in two or more staggered lines. In this case, the shape of the opening is not limited to a rectangular shape but may be extended to a circular or elliptical shape. The diameter or width of the opening is about five times the maximum diameter of the toner particles. Smooth passing of the toner particles through the opening is not only associated with the outer particle size but also with the intensity of the magnetic field.

Figure 6A:
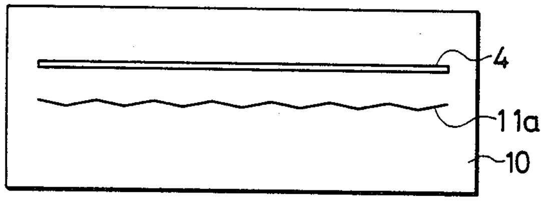
FIGS. 6A and 6B are respectively plan views showing the relationships between the recording electrodes and the directions of openings.
Figure 6B:
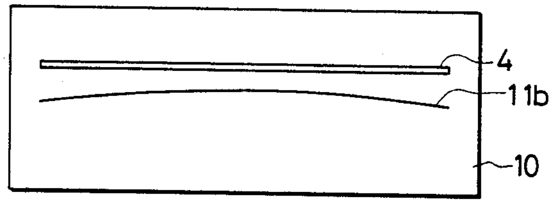

Still another embodiment for the relationship between the recording electrodes 4 and the openings will be described. In the embodiments described above, one-line or staggered openings are formed in a direction perpendicular to the extension direction of the electrodes. However, the opening may have a zig-zag shape (FIG. 6A) or may be arcuated (FIG. 6B). In this case, the toner is slightly moved in the lateral direction and squeezed. It is thus expected that the toner can more easily pass through the openings.

In the above embodiments, the openings are located on the downstream side of the recording electrodes. However, it is also effective to form the openings on the upstream side of the electrodes, as will be described below.

Figure 7:
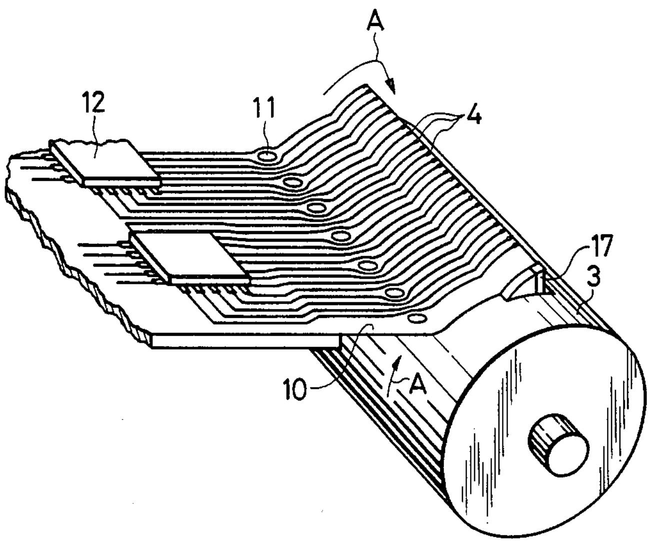
FIG. 7 is a perspective view showing another embodiment of part of an image recording unit according to the present invention.

FIG. 7 shows another embodiment of an image recording unit. A magnetic plate 17 is axially mounted on a nonmagnetic cylinder 3 incorporating a rotary magnet. The position of the magnetic plate 17 is substantially a recording position of the image. The magnetic plate 17 has a thickness of 0.01 to 1 mm and a height of 0.5 to 2 mm. The magnet in the cylinder 3 is rotated such that the toner is moved in the direction of arrow A.

The upstream side of the magnetic plate 17 along the toner moving direction is formed of a plastic material having a shape with a moderate inclined surface so as not to interfere toner feeding and is connected to the nonmagnetic cylinder 3. The downstream side of the magnetic plate 17 at the tops of the recording electrodes 4 is acute such that the toner particles are smoothly attached to a recording medium 5 (FIG. 1B). The recording electrodes 4 are aligned on a flexible printed circuit board 10 in the same manner as in the above-described embodiment. Openings 11 are formed between the electrodes 4 and electrode drivers 9. The flexible printed circuit board 10 is adhered to the nonmagnetic cylinder 3 such that the end having the recording electrodes 4 is matched with the downstream side of the magnetic plate 17 and is separated from the cylinder 3 at the openings 11. The toner for forming an image is supplied to an image recording unit through the openings 11. The toner passing through the openings 11 is moved at positions corresponding to the pitches of the openings along the direction of the arrow A. The toner distribution on the printed circuit board 10 is nonuniform. However, when the toner particles are fed by a distance two or three times the pitches of the openings, the toner distribution becomes substantially uniform. The pitch of the openings may fall within the range of 0.2 to 10 mm without trouble. If a ratio of the length of the opening to the length of the nonopening portion (pitch) is large, the toner can be smoothly fed. In this case, the ratio may be ½ to 2. Openings may be formed by a mechanical means (e.g., drilling and punching), a chemical means (etching), or other means (e.g., discharge machining or laser beam machining) according to the material and the size of the opening. This also applies to the previous embodiments.

Figure 3:
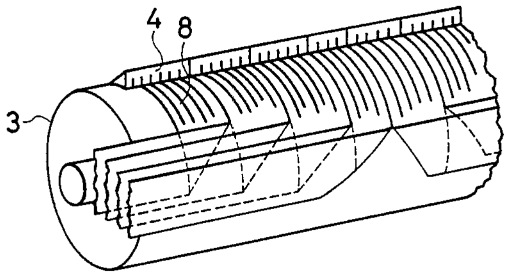
FIG. 3 is a perspective view showing a conventional image recording unit.

The upstream side of the magnetic plate along the toner moving direction has a moderate inclined surface so as not to interfere with toner feeding, and thus the printed circuit board 10 can be easily horizontally aligned with respect to the nonmagnetic cylinder 3. This also indicates that the printed circuit board 10 need not be acutely bent near the magnetic plate 17, unlike in the conventional case, as described with reference to FIG. 3. The wiring member connected to the electrode drivers through the printed circuit board 10 need not be bent. As a result, the recording electrodes do not float from the flexible circuit board or do not peel therefrom. This is also applicable to the embodiment in FIG. 1A.

In the embodiment of FIG. 1A, the electric field is concentrated on the magnetic plate 17, and a toner brush is formed on the recording electrode 4 to form an image. Even if the magnetic plate 17 is replaced with a nonmagnetic plate, a practical image can be obtained although its resolution is slightly degraded.

The surface of the magnetic plate 17 may be coated with an insulating film so as to prevent it from being short-circuited with the recording electrodes 4.

FIG. 7 shows the case wherein the recording electrodes are connected to the electrode drivers through the flexible printed circuit board to simplify the wiring operation. However, as shown in FIG. 5, each output terminal of the electrode driver may be connected to a corresponding one of the electrodes. In this case, the toner is circulated in the gaps between the wires.

In this case, the sectional area (the recording width x gap) between the recording electrodes 4 and the recording medium 5 is set to be equal to or smaller than the opening area of the printed circuit board 10 so as to prevent clogging of the toner therebetween. According to an experiment, the sectional area was set to be equal to the opening area of the printed circuit board. In this case no toner clogging occurred for a long period of time, and good image formation could be maintained.

As described above, by adapting the recording electrode assembly, the toner can be smoothly circulated onto the recording electrodes. Since the wiring member is not acutely bent or folded in correspondence with the recording electrode width, the toner during feeding does not clog. The electrodes are free from the influence of distortion of the wiring member upon bending. In addition, the peripheral members of the recording electrodes can be arranged compactly near the electrodes. Therefore, the apparatus as a whole can be made compact.

When the openings are formed on the upstream side of the recording electrodes as in FIG. 7, the total amount of the toner reaching the recording electrodes can be adjusted.

What is claimed is:

1. A recording head assembly using a magnetic toner, comprising:

recording electrodes arranged in a direction perpendicular to a moving direction of a magnetic field generated by moving magnetic field generating means; and a wiring member, having openings through which toner is moved by a magnetic force of said moving magnetic field generating means and conductive wires corresponding to said recording electrodes so as to electrically connect said recording electrodes with electrode drivers.

2. An assembly according to claim 1, wherein said wiring member comprises a flexible printed circuit board, said openings are formed in said flexible printed circuit board, and said conductive wires contour said openings and reach said recording electrodes.

3. An assembly according to claim 2, wherein said openings are formed in a staggered form along a direction of said recording electrodes.

4. An assembly according to claim 1, wherein said openings of said wiring member are defined by insulated conductive wires connecting said recording electrodes and said electrode drivers.

5. An assembly according to claim 1, wherein said openings are located at a downstream side of said recording electrodes along a toner feed direction.

6. An assembly according to claim 1, wherein said openings are located at an upstream side of said recording electrodes along a toner feed direction.

7. An assembly according to claim 1, wherein said recording electrodes are fixed to a nonmagnetic cylindrical sleeve.

8. An assembly according to claim 1, wherein said openings are formed at positions along said recording electrodes.

9. An assembly according to claim 1, wherein said openings are formed not to be parallel to said recording electrodes.

10. An image forming apparatus with a recording head using a magnetic toner, comprising:

moving magnetic field generating means;

recording electrodes arranged in a direction perpendicular to a moving direction of a magnetic field generated by said moving magnetic field generating means;

a wiring member, having openings through which toner is moved by a magnetic force of said moving magnetic field generating means and conductive wires corresponding to said recording electrodes so as to electrically connect said recording electrodes with electrode drivers;

recording electrode support means located between said recording electrodes and said moving magnetic field generating means, said recording electrode support means being adapted to support said recording electrodes and being arranged along said moving magnetic field generating means; and a recording member located opposite said recording electrodes, said recording member being adapted such that a toner image is formed thereon.

11. An apparatus according to claim 10, wherein said wiring member comprises a flexible printed circuit board, said openings are formed in said flexible printed circuit board, and said conductive wires contour said openings and reach said recording electrodes.

12. An apparatus according to claim 10, wherein said openings are formed in a staggered form along a direction of said recording electrodes.

13. An apparatus according to claim 10, wherein said openings of said wiring member are defined by insulated conductive wires connecting said recording electrodes and said electrode drivers.

14. An apparatus according to claim 10, wherein said openings are located at a downstream side of said recording electrodes along a toner feed direction.

15. An apparatus according to claim 10, wherein said openings are located at an upstream side of said recording electrodes along a toner feed direction.

16. An apparatus according to claim 10, wherein said moving magnetic field generating means comprises a rotary magnet roller having opposite magnetic poles alternately formed along a circumferential direction thereof, and said recording electrode support means comprises a nonmagnetic cylindrical sleeve covering said rotary magnet roller.

17. An apparatus according to claim 10, wherein said openings are formed at positions along said recording electrodes.

18. An apparatus according to claim 10, wherein said openings are formed not to be parallel to said recording electrodes.

19. A magnetic head assembly using a magnetic toner, comprising:

moving magnetic field generating means having opposite magnetic poles along a circumferential direction thereof and rotated about an axis thereof;

recording electrodes arranged in a direction perpendicular to a moving direction of a magnetic field of said moving magnetic field generating means;

a wiring member, having openings through which toner is moved by a magnetic force of said moving magnetic field generating means and conductive wires corresponding to said recording electrodes so as to electrically connect said recording electrodes with electrode drivers;

nonmagnetic recording electrode support means located between said recording electrodes and said moving magnetic field generating means, said recording electrode support means being adapted to support said recording electrodes and being arranged along said moving magnetic field generating means; and a toner vessel located below said recording electrode support means.

20. An apparatus according to claim 19, wherein said wiring member comprises a flexible printed circuit board, said openings are formed in said flexible printed circuit board, and said conductive wires contour said openings and reach said recording electrodes.

21. An apparatus according to claim 20, wherein said openings are formed in a staggered form along a direction of said recording electrodes.

22. An apparatus according to claim 19, wherein said openings of said wiring member are defined by insulated conductive wires connecting said recording electrodes and said electrode drivers.

23. An apparatus according to claim 19, wherein said openings are located at a downstream side of said recording electrodes along a toner feed direction.

24. An apparatus according to claim 19, wherein said openings are located at an upstream side of said recording electrodes along a toner feed direction.

25. An apparatus according to claim 19, wherein said recording electrodes are fixed on said nonmagnetic cylindrical sleeve.

26. An apparatus according to claim 19, wherein said openings are formed at positions along said recording electrodes.

27. An apparatus according to claim 19, wherein said openings are formed not to be parallel to said recording electrodes.

28. A recording head assembly using a magnetic toner, comprising:

recording electrodes arranged in series; and a wiring member, having openings through which toner is moved by a magnetic force of magnetic field generating means and conductive wires corresponding to said recording electrodes so as to electrically connect said recording electrodes with electrode drivers.

29. An image forming apparatus with a recording head using a magnetic toner, comprising:

magnetic field generating means for conveying said toner;

recording electrodes arranged in series;

a wiring member, having openings through which toner is moved by a magnetic force of said magnetic field generating means and conductive wires corresponding to said recording electrodes so as to electrically connect said recording electrodes with electrode drivers;

recording electrode support means located between said recording electrodes and said magnetic field generating means, said recording electrode support means being adapted to support said recording electrodes and being arranged along said magnetic field generating means; and a recording member located opposite said recording electrodes, said recording member being adapted such that a toner image is formed thereon.

30. A magnetic head assembly using a magnetic toner comprising:

magnetic field generating means having opposite magnetic poles along a circumferential direction thereof;

recording electrodes arranged in a direction perpendicular to a direction of a magnetic field of said magnetic field generating means;

a wiring member, having openings through which toner is moved by a magnetic force of said magnetic field generating means and conductive wires corresponding to said recording electrodes so as to electrically connect said recording electrodes with electrode drivers;

nonmagnetic recording electrode support means located between said recording electrodes and said magnetic field generating means, said recording electrode support means being adapted to support said recording electrodes and being arranged along said magnetic field generating means; and a toner vessel located below said recording electrode support means.

* * * * *